US010718955B2

(12) United States Patent
Rubaud et al.

(10) Patent No.: US 10,718,955 B2
(45) Date of Patent: Jul. 21, 2020

(54) DEVICE FOR CONNECTING SPECTACLE TEMPLES TO THE FRAME FRONT

(71) Applicants: Marc-Antoine Rubaud, Aix-les-Bains (FR); Guillaume Thuau, Chatenay Malabry (FR)

(72) Inventors: Marc-Antoine Rubaud, Aix-les-Bains (FR); Guillaume Thuau, Chatenay Malabry (FR)

(73) Assignee: BAARS ET ASSOCIES, Oyonnax (FR)

( * ) Notice: Subject to any disclaimer, the term of this patent is extended or adjusted under 35 U.S.C. 154(b) by 0 days.

(21) Appl. No.: 15/306,746

(22) PCT Filed: Apr. 10, 2015

(86) PCT No.: PCT/FR2015/050964
§ 371 (c)(1),
(2) Date: Oct. 25, 2016

(87) PCT Pub. No.: WO2015/162354
PCT Pub. Date: Oct. 29, 2015

(65) Prior Publication Data
US 2017/0045754 A1     Feb. 16, 2017

(30) Foreign Application Priority Data

Apr. 25, 2014   (FR) ..................... 14 53754

(51) Int. Cl.
*G02C 5/14*     (2006.01)
*G02C 5/22*     (2006.01)
*G02C 5/00*     (2006.01)

(52) U.S. Cl.
CPC ............. *G02C 5/146* (2013.01); *G02C 5/008* (2013.01); *G02C 5/2272* (2013.01); *G02C 2200/02* (2013.01); *G02C 2200/08* (2013.01)

(58) Field of Classification Search
None
See application file for complete search history.

(56) References Cited

U.S. PATENT DOCUMENTS

2009/0195747 A1* 8/2009 Insua .................... G02C 5/146
                                                                351/116
2013/0114039 A1* 5/2013 Zelazowski .......... G02C 5/2209
                                                                351/153
2015/0338678 A1* 11/2015 Fafaul .................... G02C 1/06
                                                                351/86

* cited by examiner

*Primary Examiner* — William R Alexander
*Assistant Examiner* — Gary W O'Neill
(74) *Attorney, Agent, or Firm* — Hershkovtiz & Associates, PLLC; Abe Hershkovtiz

(57) ABSTRACT

According to the invention, spectacles include a frame front (2) onto which the temples (3*a*, 3*b*) are attached, characterized in that the temples are detachably connected to the frame front by means of a magnet (7).

4 Claims, 6 Drawing Sheets

DEVICE FOR CONNECTING SPECTACLE TEMPLES TO THE FRAME FRONT

Figure 1:
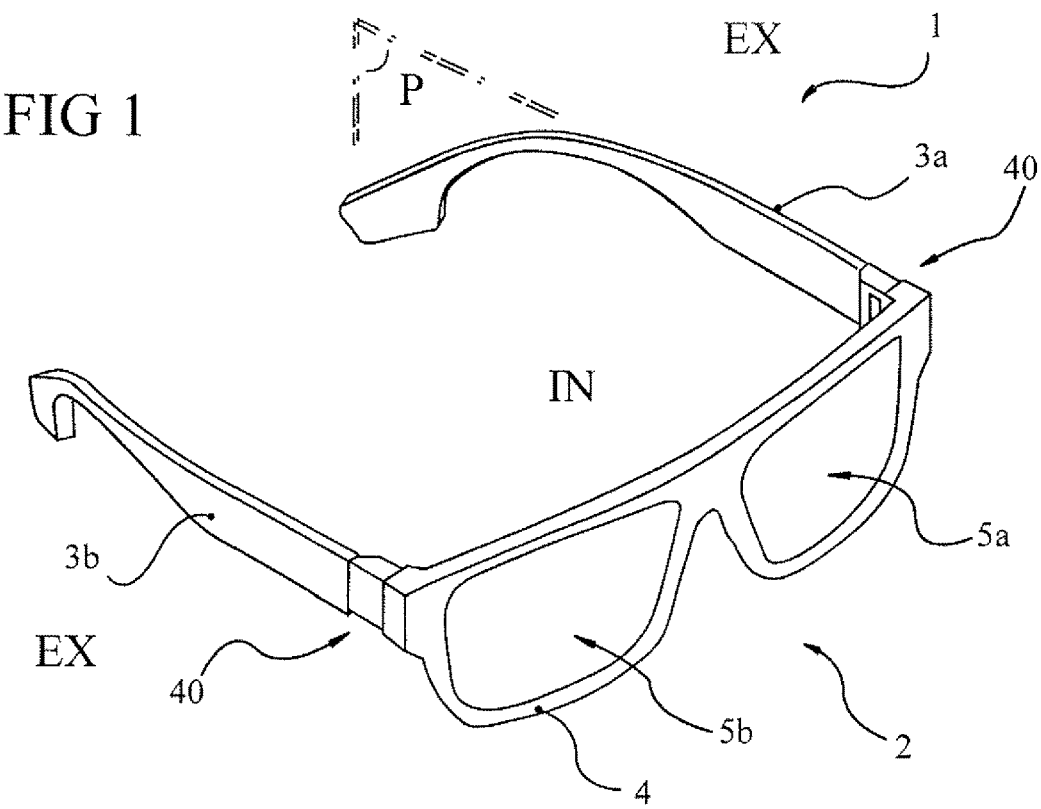

The present invention relates to an improvement for eyeglasses, and more particularly to an improvement regarding connection of the temples.

A number of devices for connecting temples to the frontal portion of eyeglasses are already known. Many devices are simple pivoting systems, but given fashion trends, designers have conceived of connecting devices that allow different types of temples to be installed on the frontal portion of the eyeglasses. For example, designers have developed removable temple connection devices, for example the one described in the patent application FR 1 351 894. The connection is made by clipping using an elastic system, which makes for haphazard retention of the temple.

Pivoting connections are also known, for example the one described by the patent application FR 2 956 751; retention of the temples once positioned on the face is indeed ensured, but it is not possible for the user to make a change in the temples as he or she wishes. The eyeglasses described, which comprise two magnets, are moreover much too heavy to be comfortable to wear.

The present invention aims to solve the problem referred to above by making an improvement to this type of device.

The eyeglasses according to the invention, comprising a frame front to which the temples are fastened, are thus characterized in that the connection of the temples to the frame front is detachable, and is implemented via a magnet.

According to a complementary characteristic the magnet, integral with the frame front or with the temples, interacts with a housing integral respectively with the temples or with the frame front, said housing being constituted by an assemblage of metal panels to form an insertion receptacle.

According to a preferred embodiment, the housing implemented by an assemblage of metal panels is constituted by a lateral panel, an upper panel, and a lower panel as well as a base panel, to form the insertion receptacle, while its shape and its dimensions correspond to the shape and dimensions of the connecting portion of the magnet.

According to another characteristic, the frame front comprises lateral connecting parts intended to interact with the connecting ends of the temples.

It is apparent that in contrast to known eyeglasses, the temples of the eyeglasses according to the invention are not mounted pivotedly on the frame front and in particular on the frame around a vertical axis, which allows the user to decouple the temples without using a tool.

It is also apparent that retention of each of the temples was accomplished using a single magnet, integral with the frame or with the temples, interacting with a metal part integral respectively with the temples or the frame.

In addition, the simplicity of the system makes it very reliable and durable with no risk of breakage, which is not the case with pivoting temple hinges.

The invention also relates to the frame alone and/or to the temples alone.

Other characteristics and advantages of the invention will emerge from the description that will follow, with reference to the attached drawings which are provided only as non-limiting examples.

Figure 2:
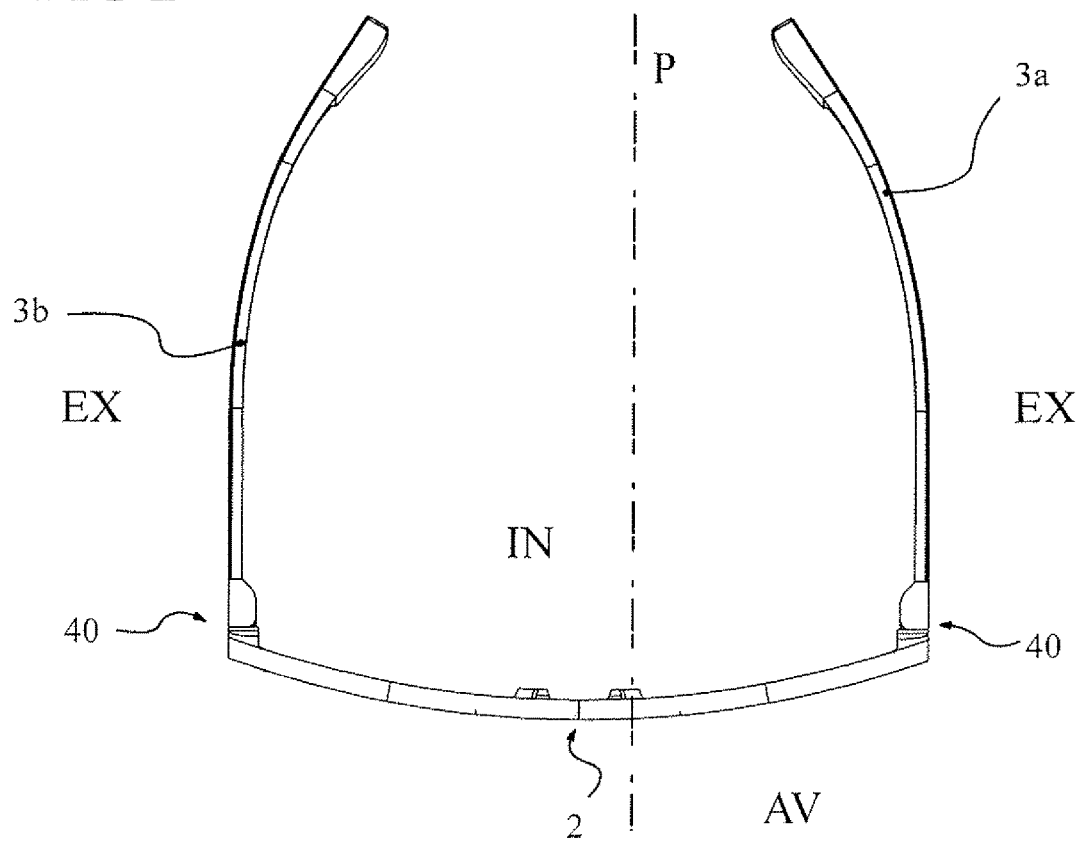
Figure 3:
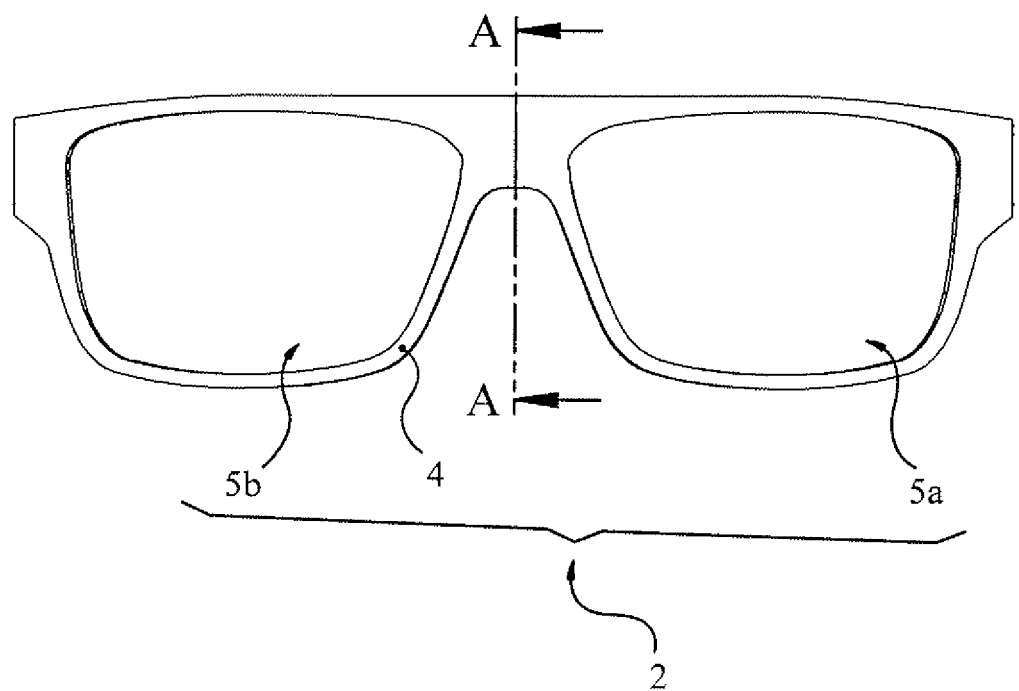
Figure 4:
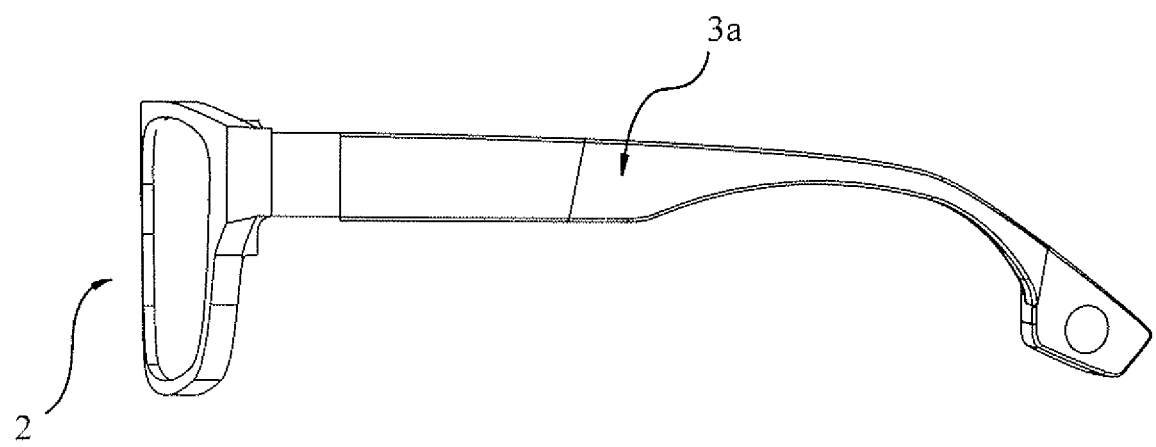
Figure 5A:
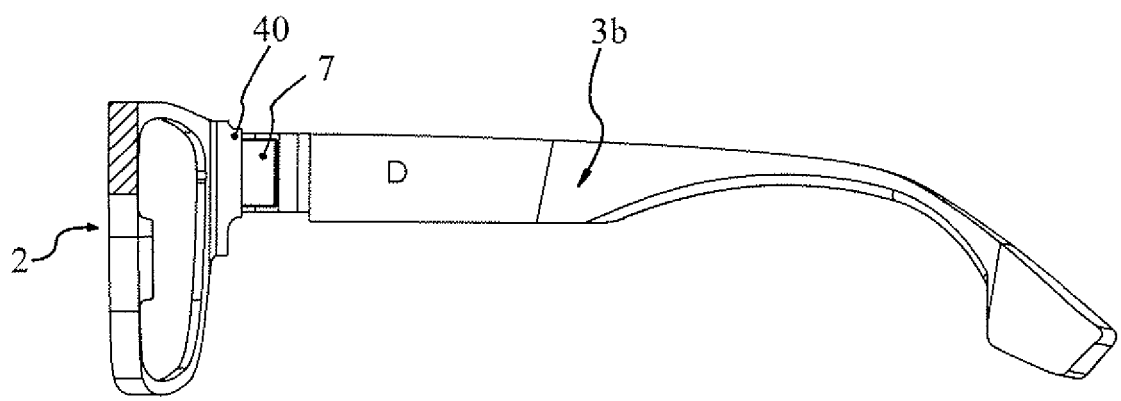
Figure 5B:
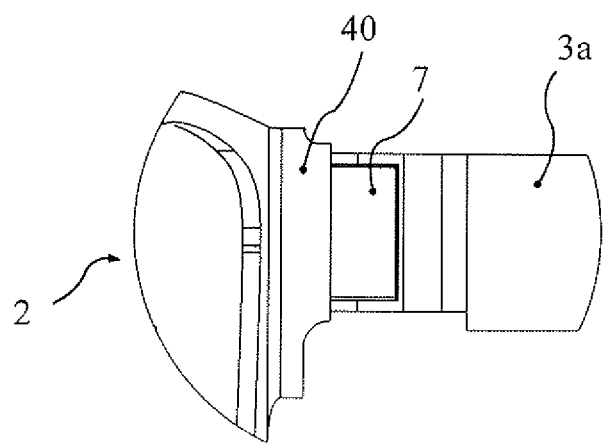
Figure 6A:
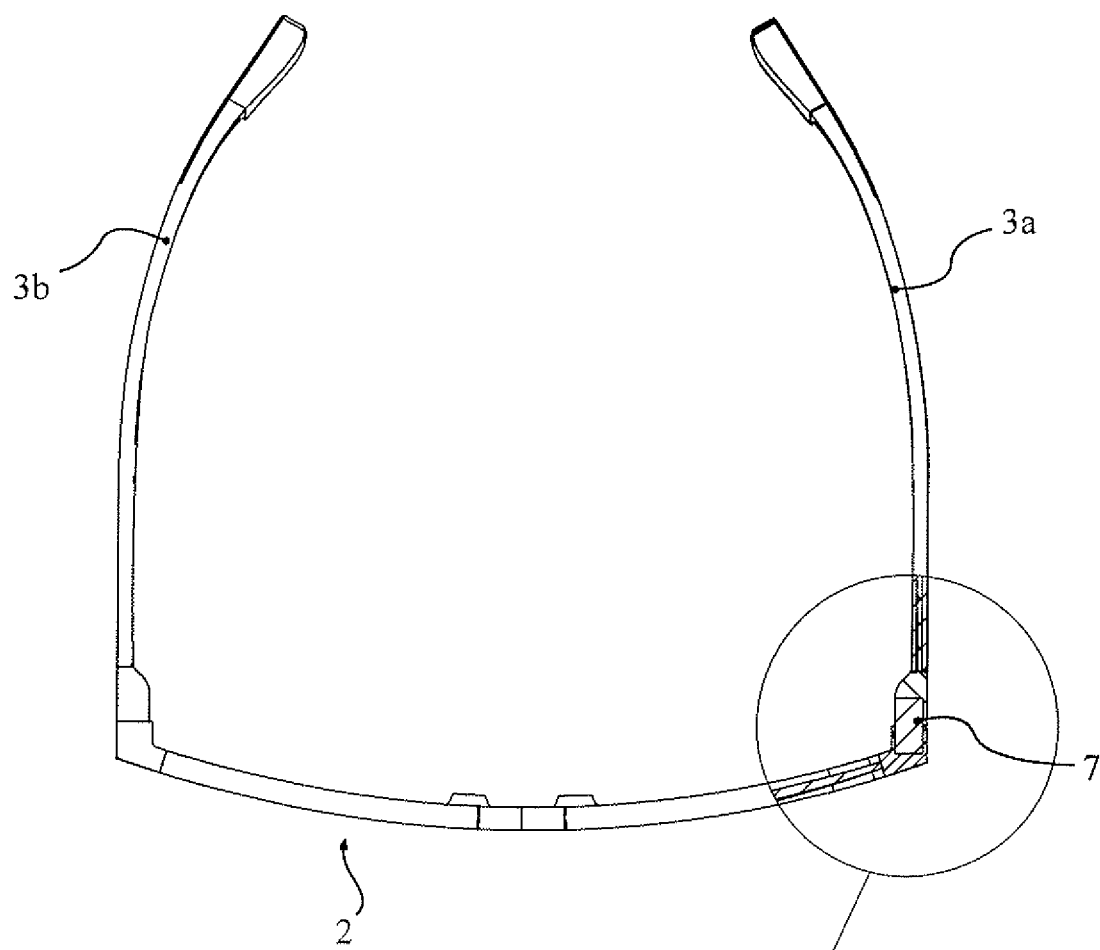
Figure 6B:
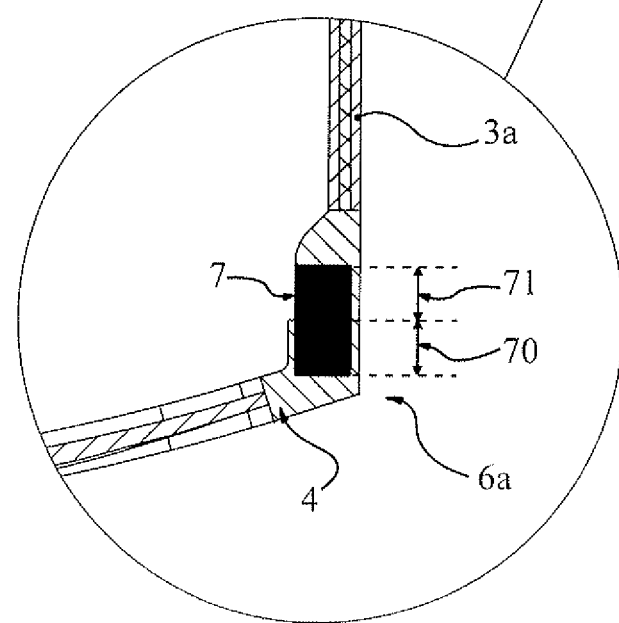
Figure 7:
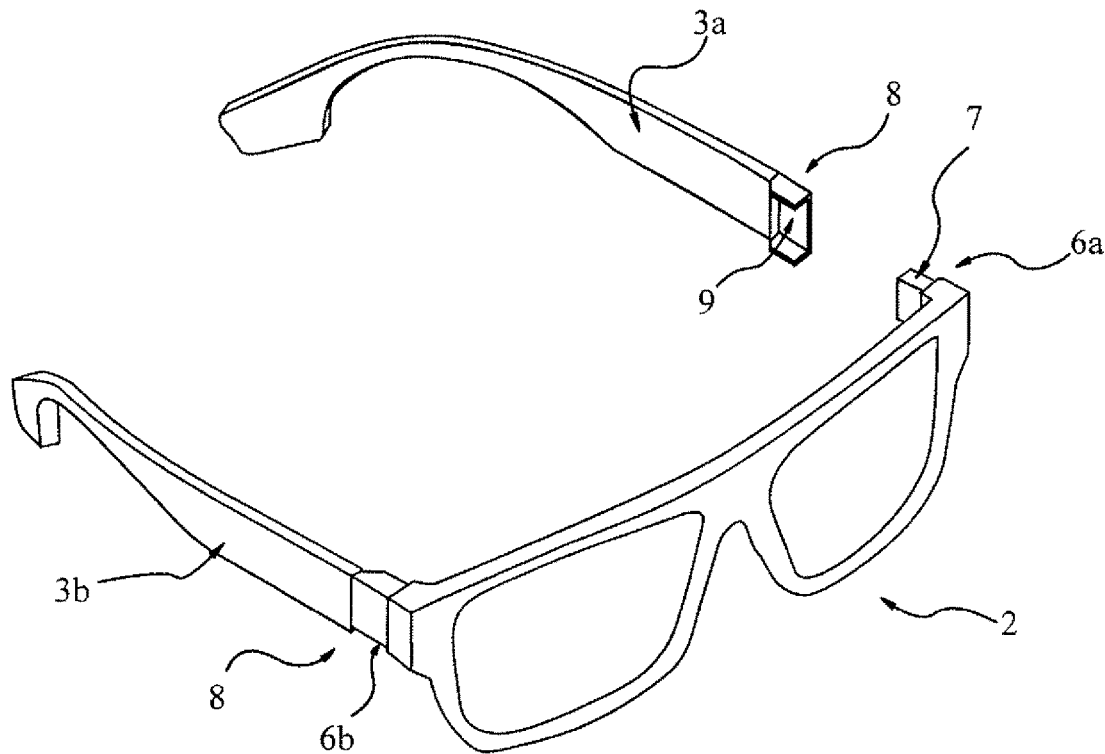
Figure 8:
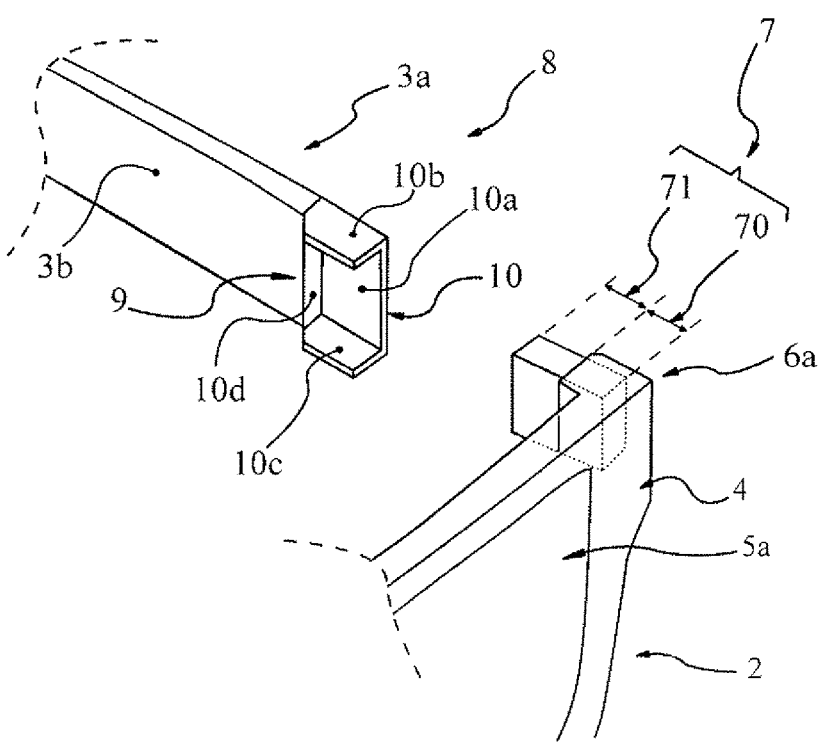
Figure 9:
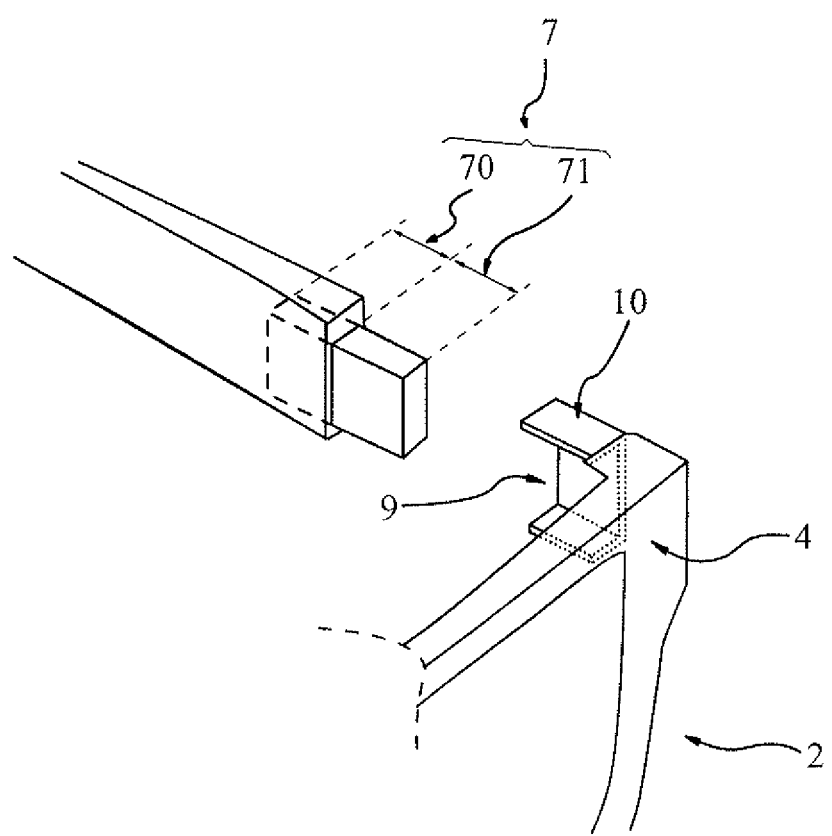

FIG. 1 is a perspective view of the eyeglasses according to the invention.
FIG. 2 is a top view.
FIG. 3 is a frontal view.
FIG. 4 is a side view.
FIG. 5a is a section view along A-A, while FIG. 5b illustrates the temple connection in detail.
FIG. 6a is a top view, with a partial section illustrated in FIG. 6b.
FIG. 7 is a perspective view illustrating how the connection of the temple onto the frame front is effected, before said connection is made.
FIG. 8 is a perspective view, at larger scale, of details of FIG. 7.
FIG. 9 is a view similar to FIG. 8 illustrating another embodiment.

The eyeglasses according to the invention, designated in the Figures by the overall reference (1) and having a general plane of symmetry (P), are constituted in known fashion by a frame front (2) and two temples (3a, 3b).

The frame front can be, for example, of the kind having a frame and two optical or tinted lenses, or having no frame but merely having lateral connecting parts to secure the temples.

The invention illustrated will be implemented using a frame. The frame front (2) is thus constituted by a frame (4) retaining two optical lenses (5a, 5b) that are either corrective or tinted or both.

The temples (3a, 3b), which are intended to ensure that the eyeglasses stay on the wearer's face, are connected at the lateral ends (40) of the frame front (2) either to the frame (4) or directly to the lenses (5a, 5b) in the case of frameless eyeglasses, the latter by means of lateral connecting parts (6a, 6b).

According to the invention the connection of the temples (3a, 3b) is detachable, in order to leave to the wearer the initiative of selecting his or her temples. A "detachable" connection is to be understood as a connection that allows the temples to be removed without tools, as opposed to temple fastening systems using a mechanical pivot around a vertical axis, as is the case in most cases.

According to another characteristic, retention of each of the temples on the lateral connecting parts (6a, 6b) is effected thanks to at least a single magnet (7) per side.

According to the preferred mode of the invention, the magnets (7) are integral with the lateral connecting parts (6a, 6b).

The magnets (7), which advantageously are parallelepipedal in shape, have a first part (70) retained in the corresponding connecting part (6a, 6b) and project outward, on the side on which the temples extend, by way of a second part (71) or connecting part. Said second part (71) is intended to interact with the end of the corresponding temple in order to provide detachable connection thereof.

For this purpose, the connecting end (8) of each of the temples (3a, 3b) comprises a metal insertion receptacle (9) intended to receive the projecting part of the magnet (71). Said insertion receptacle (9) is implemented by a metal part (10) integral with the connecting end of each of the temples.

The metal part (10) is constituted by an assemblage of metal panels forming a retaining housing (10). The housing is thus constituted by a side panel (10a), an upper panel (10b), and a lower panel (10c) as well as a base panel (10d), to form the insertion receptacle (9). The latter is open toward the inner side (IN) and toward the front (AV), which allows the user to easily install and remove temples.

Specifically, the shape and dimensions of the insertion receptacle (9) correspond to the shape and dimensions of the second projecting part (71) of the magnet (7). Note that the side panel (10a) is arranged on the outer side (EX) of the end (8) of the temple.

Specifically, the assemblage of panels, by interacting with the magnet (7), prevents a displacement movement of the temple, and this type of coupling offers maximum retention rigidity so that the temples remain in place while still being easy to remove.

FIG. 9 is a perspective view similar to FIG. 8, illustrating another embodiment. According to this other embodiment it is the connecting ends (8) of the temples (3a, 3b) which comprise the magnet (7), while the frame front (2) comprises the corresponding metal insertion receptacle (9). As in the embodiment described previously, the magnet (7), which is integral with the end of each of the temples (3a, 3b), comprises a projecting part (71) intended to be engaged into the insertion receptacle (9) and to be retained thanks to the effect of the magnet.

Said metal receptacle (9) intended to receive the projecting part (71) of the magnet (7) comprises an assemblage of metal panels, i.e. is constituted by a side panel (10a), an upper panel (10b), and a lower panel (10c), as well as a base panel (10d), so as to form the insertion receptacle (9). Note that, as previously, the shape and dimensions of the insertion receptacle (9) correspond to the shape and dimensions of the second, projecting part (71) of the magnet. Note that in this embodiment, the side panel (10a) is arranged on the inner side (IN) of the frame front.

It is apparent that in accordance with the two embodiments that have been described and illustrated, the second, projecting part (71) of the magnet (7) constitutes the connecting part of the magnet (7).

The invention claimed is:

1. Eyeglasses comprising a frame front on which temples are detachably connected, the detachable connection of each of the temples to the frame front being implemented by a respective magnet,
   wherein each of the magnets is integral with the frame front and wherein a connecting portion of each of the magnets removably interacts directly with a respective housing that is integral with an end of a respective one of the temples to thereby detachably connect the frame front to the temples, each of said housings being constituted by an assemblage of metal panels to form an insertion receptacle,
   wherein the assemblage of metal panels of each of the housings is constituted by a lateral panel arranged on an outer side of the end of the temple, an upper panel, and a lower panel as well as a base panel,
   wherein the frame front includes two lateral connecting parts, each of the magnets having a parallelepipedal shape and being mounted in a respective of the two lateral connecting parts;
   wherein in respective ones of the two lateral connecting parts an entirety of a periphery of a first part of respective ones of the magnets is retained, and a second part of the respective ones of the magnets projects from the first part in a direction respective ones of the temples extend and cooperates with a respective one of the housings that is integral with an end of a respective one of the temples, to thereby detachably connect the frame front to the temples.

2. The eyeglasses according to claim 1, wherein the shape and dimensions of the insertion receptacle correspond to the shape and dimensions of the connecting portion of the magnet.

3. The eyeglasses according to claim 2, wherein the frame front comprises lateral connecting parts for interacting with connecting ends of the temples.

4. The eyeglasses according to claim 1, wherein the frame front comprises lateral connecting parts for interacting with connecting ends of the temples.

\* \* \* \* \*